June 3, 1941.  A. V. BEDFORD ET AL  2,243,892
CAMERA SUPPORTING PEDESTAL
Original Filed Nov. 5, 1936   2 Sheets-Sheet 1
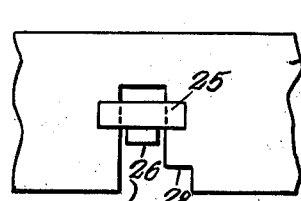
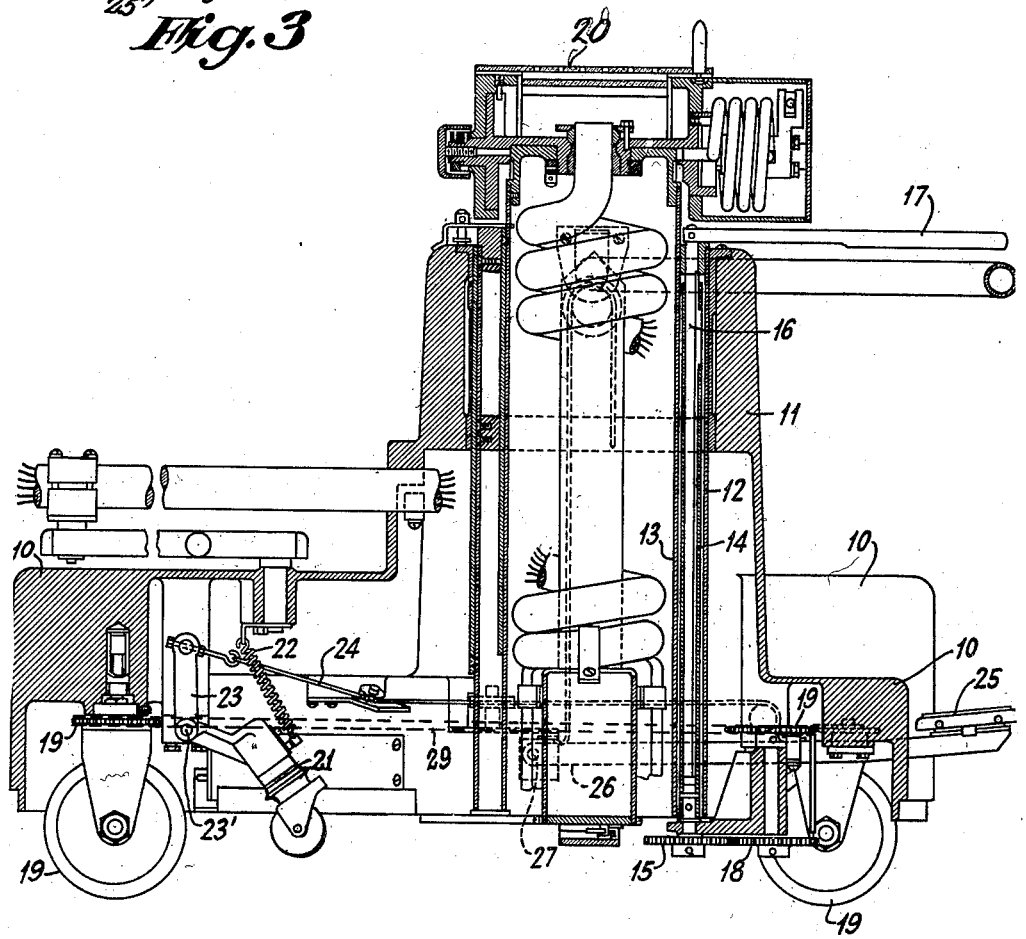
INVENTORS
ALDA V. BEDFORD AND
BY KNUT J. MAGNUSSON
ATTORNEY

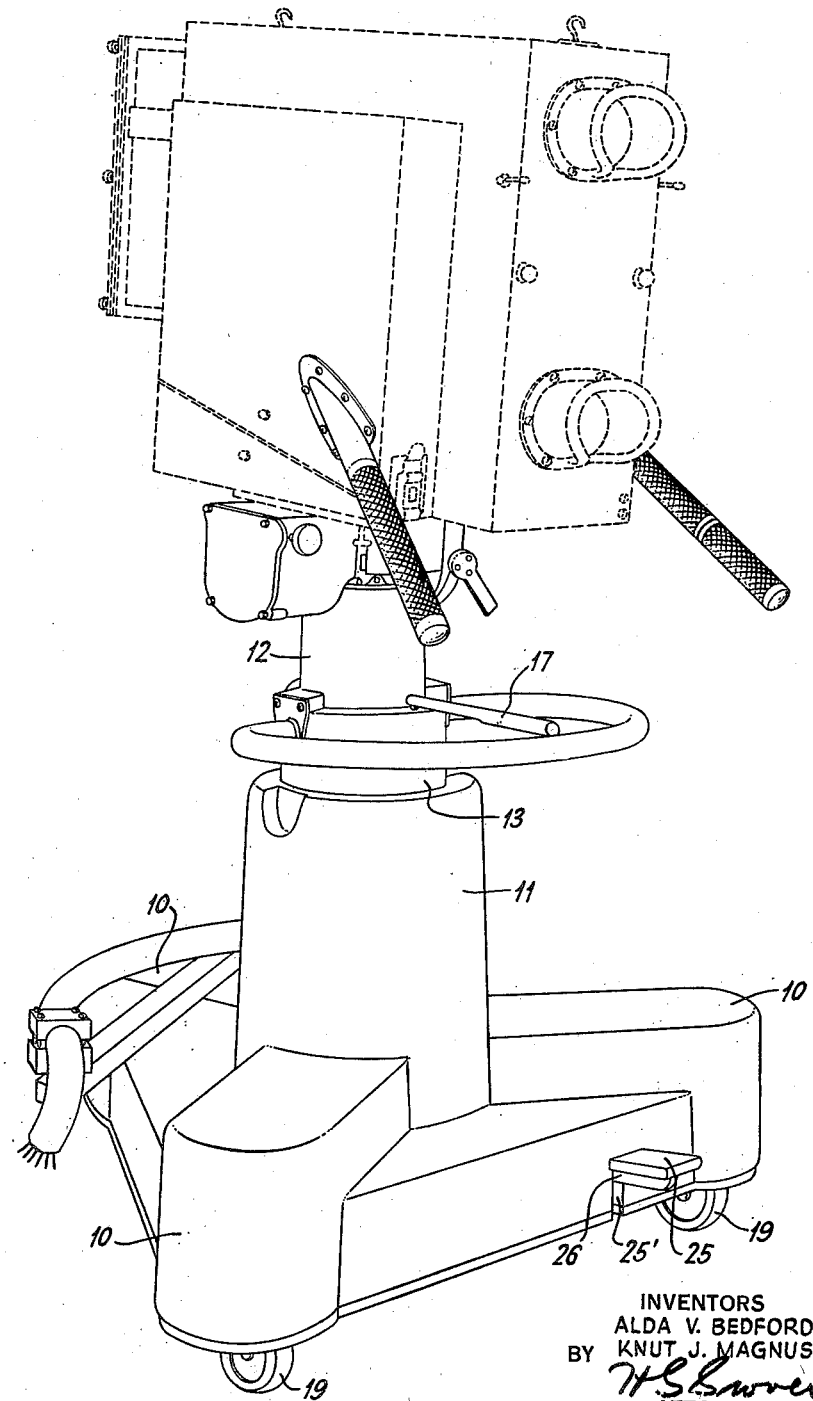

Patented June 3, 1941

2,243,892

UNITED STATES PATENT OFFICE 2,243,892

CAMERA SUPPORTING PEDESTAL

Alda V. Bedford, Collingswood, and Knut J. Magnusson, Merchantville, N. J., assignors to Radio Corporation of America, a corporation of Delaware Original application November 5, 1936, Serial No. 109,390. Divided and this application September 30, 1937, Serial No. 166,476

3 Claims. (Cl. 280—44)

The present invention is a division of our application Serial No. 109,390 filed November 5, 1936, and relates to television camera structures and particularly to that portion of the camera which is known in the art as a television camera dolly and which is used to carry or support the camera equipment by which the optical image is converted into electrical signals which at receiving points produce an electro-optical representation of the subject at the transmission point.

Reference should be had to my co-pending applications Serial No. 166,477 filed September 30, 1937; Serial No. 166,478 filed September 30, 1937; Serial No. 109,390 filed November 5, 1936, and Serial No. 109,391 filed November 5, 1936.

It has long been established from the motion picture industry that for the purpose of changing from remote to close-up shots or vice versa or for the purpose of tilting or changing from a low viewing point of the subject to an elevated viewing point or for the purpose of obtaining panoramic views, it is desirable to provide ways and means by which the film taking equipment can be moved about from place to place in order to accomplish these ends in a most suitable and convenient manner.

However, many reasons present themselves for making such known forms of motion picture apparatus not satisfactory or suitable for television practice. Among the difficulties which present themselves in television practice are those which are due to the necessity of a great number of electric cables connected to the camera device. Also, apparatus of this nature must be entirely free as well as shielded from both electrical and audible disturbances which would otherwise spoil or ruin the resultant picture and/or sound transmission. In addition, compact apparatus is desirable in order to lend more flexibility to development trends since compactness of apparatus which includes all necessary control features permits full and complete control by a single operator.

The features of the camera equipment per se are described and claimed in a co-pending application filed by the present inventors on even date herewith. In the co-pending application, the relationship between the view finding and focussing arrangements, the internal cabinet construction and the camera per se, and other related features, have been described and claimed. The present invention is, however, directed more particularly to the manner by which the camera equipment may be moved about from place to place and set and adjusted to such positions as to provide for obtaining all desired types of views.

In general, the subject matter of the present invention is directed to the apparatus and means for providing different elevations of the television camera equipment. It is also concerned with suitable arrangements to provide for the taking of panoramic views and tilting of the taken view to different angles. The camera equipment itself is heavy and suitable ways and means are provided to compensate for the shifting of the camera weight due to tilting. In motion picture practice, it has been customary to provide a counterbalancing boom to balance the weight of the tilted camera but with television camera equipment which can be controlled by a single operator such type construction is not desirable. Accordingly, this invention provides resilient or mechanical means to compensate and equalize any shifting of the camera weight with respect to the axis of support so that the camera shall at all times be perfectly balanced irrespective of its position of tilt.

Further, the present invention is so constituted as to provide ways and means by which the camera equipment may be steered from one position to another while still permitting the operator of the camera to watch continually the subject to be televised and at this time adjust the focus of the light image upon the light sensitive image transmitting tube without being required to watch continually the actual direction in which the camera equipment is being propelled. This is accomplished by interlocking the wheels upon which the pedestal or dolly is moved and at the same time arranging a steering lever so as to indicate the direction of travel.

In the event that it becomes necessary to turn the supporting pedestal or dolly in a circular path, suitable ways and means operating in conjunction with an elevating roller operable at the will of the operator are provided.

The provision of the foregoing features are all included among the several other objects and advantages of the invention, but other objects of course will become apparent and at once suggest themselves to those skilled in the art to which the invention is directed by reading the following specification and claims in connection with the several figures of the accompanying drawings wherein:

Fig. 1 is an elevation of the pedestal as seen on a cutting plane containing a major axis, and Fig. 2 is a perspective view.

Fig. 3 shows the castor actuating and holding means.

The general shape of the pedestal may best be seen from the perspective shown in Fig. 2. In general, the pedestal is comprised of three radially extended arm members spaced 120° apart from each other and each extending radially from a vertically positioned housing containing a tubular shaped receptacle, the latter being used to accommodate the elevating telescoping mechanism. The arm members referred to are located at the base of the pedestal and are joined to each other by three plane faced triangularly shaped metallic members. Joined to each of the radial arm members is a supporting wheel containing a sprocket, the function of which will be explained hereinafter. The radial arm members are preferably hollowed except at their extremity where the sprocket wheel is accommodated, the hollow feature being used in order to make the arm form both a housing and support member for the apparatus for operating the steering means and for the elevating means which supports the object to be accommodated by the pedestal. Joined to the upright tubular receptacled member at the center of the pedestal is a tubular arm extending around in a substantially semi-circular fashion and against which an operator may push in order to move the pedestal on its wheels or rest in pulling the camera in order to make smoother the actual movement, the pedestal being of a type which is particularly adaptable for the support of motion picture cameras, television cameras, etc., so that mobility plays an important part.

Referring to Fig. 1, the radial arm members 10 are joined to an upright housing 11 which is tubularly hollowed at its center portion, fitting into the tubular opening is a hollow first or outer tubular member 12 and a second or inner hollow tubular member 13. The tubular members and receptacle are in this particular case cylindrically shaped, but it will be appreciated that their shape might be other than circular, such as rectangular, hexagonal, or the like. The two tubular members 12 and 13 form the telescopic elevating mechanism for the plate 20 to which the object to be supported by the pedestal is secured.

Spaced between the first and second tubular members 12 and 13 respectively is a hollow tube shaped member 14 which is joined at one extremity to a gear 15 and whose other extremity is supported in position between the two cylinders. This latter tubular member 14 is slotted, and inserted in the member is a keyed rod arm 16 which extends upwardly past the extremity of the first tubular telescopic elevating member 12 where it is joined to a lever arm 17. The gear 15 is placed in co-operative relationship to a driven gear 18 which is rigidly connected axially with one of the sprocket members 19. The sprocket members on each of the wheels are joined together by a sprocket chain 29, and the gear arrangement 15, 18, the hollow slotted tube 14 and the keyed rod arm 16 and lever arm 17 from the steering mechanism to guide the pedestal during mobility.

The action of the steering mechanism of the exemplified form illustrated is as follows: It is highly desirable in a support structure for television camera usage, which is a primary purpose of this invention, to limit the path of movement substantially only to a straight line path in order to preclude the possibility of rotation of the camera away from the object to be televised while the actual transmission of image signals or "televising" is taking place. Again, it is desirable at times when televising a "shot" to so arrange the apparatus as to make possible obtaining a perspective or panorama view, herein called "panning." This would be particularly desirable for instance where a large group of people were to form the subject of transmission, and naturally, in a "close-up shot" all could not be within the field of view of the optical system, and so to obtain a close-up of each small group or individuals the television camera should be turned, or "panned," to include the desired portions of the large group.

By means of steering arrangement shown herein, the camera always faces the same direction regardless of the direction in which the pedestal is moved. The wheels 19, through an interlocking arrangement, are maintained with their axes permanently parallel each to the other. By the arrangement illustrated, the sprocket chain which serves to control the turning of the wheel axis about a vertical axis, serves as an interlocking member between the wheels. Upon turning the lever arm 17, the keyed member 16 will turn the slotted tubular member 14 which is joined at its extremity to the gear 15. This gear 15 will then turn the gear 18 which causes the sprocket of one of the wheels to turn and, due to the connecting sprocket chain between this wheel and each of the other wheels, the chain movement causes each wheel to turn just sufficiently to keep their axes parallel to that of the turned wheel. Thus with a suitable initial parallel axes adjustment of the several wheels, it is clear that the device can move only in a direction at right angles to the axes of these wheels. Since there is a chain link connecting the driving pinion or gear 15 with the driven pinion or gear to cause the various sprocket wheels fixedly mounted on the supporting spindle for each wheel axis to turn, it is clear that unless suitable means for adjusting the position of one of the wheels relative to the other two is provided, the chain length as determined by the various links could easily be such that a slight degree of slippage between various wheel elements might be present. Accordingly, suitable means is provided by supporting the spindle carrying the yoke member to support the front wheel for sliding this yoke to a position where the chain is at all times kept tight. One suitable means for accomplishing this result is through the adjustment of the positioning screw to move the wheel yoke both forward and with a slight degree of rotation.

It was above explained that there is a driving and driven pinion or sprocket wheel forming a part of the driving arrangement for moving the sprocket chain. It will be obvious that the use of the driven gear or sprocket wheel is for the purpose of reversal of the direction of rotation or movement of the driven chain. When this has been provided, the steering rod 17, if turned will indicate immediately the direction toward which the pedestal member will move and, at the same time, maintain the steering rod 17 always in a position perpendicular to the axes of the several wheels. With this arrangement, the operator of the television camera equipment by setting the position of the steering rod 17 so that it points at the desired subject or part of the subject of which it is desired to transmit at any instant the image when the camera equipment itself is moved toward or away from that subject or part of the subject, the camera will move only along a straight path of travel. The operator's attention, therefore, can be directed solely to maintaining the proper focusing of the subject on the mosaic electrode of the transmitting tube and upon the optical viewing plane, as explained in the co-pending application above noted.

It is desirable, of course, that some means be had to rotate the pedestal structure when desired, since the path of motion otherwise would be restricted solely to straight line motion due to the interlocking of the wheels and the pedestal with its supported structure could not conveniently be moved from place to place or faced in different directions without further adjustable features. For this purpose, there is provided a castor member 21 which is normally kept in a retracted position by spring 22 so as to be out of contact with the surface upon which the rollers 19 rest. The normally retracted castor 21 is supported by a bellcrank lever 23 pivoted to the frame at 23'. Joined to the bellcrank lever for the purpose of turning it about the pivot point 23' is a cable member 24 which passes over a succession of pulleys so positioned that the cable will clear all apparatus contained in the pedestal base. The cable connects at the end remote from the connection to the bellcrank lever 23 with a lever connected with a treadle member or a foot pedal 25 carried in one of the radial arms of the base. This foot pedal is joined to the lever arm 26 which has its fulcrum at a point 27. Accordingly, it will be seen that when the foot pedal 25 and lever arm 26 are pressed downwardly in a positioning slot 25' in the supporting base member, the cable 24 is retracted and the bellcrank arm 23 is turned about its pivot point. As the bellcrank arm and castor are greater in length from their mounting position than the sprocket wheel 19 associated immediately adjacent thereto, the radial arm to which the castor is joined will be forced upwardly and the sprocket wheel 19 is taken out of contact with the supporting surface. The freely rotating castor and rollers then form the support for that radial arm. This castor member preferably is located at the front of the pedestal, and on the side opposite that from which the operator of the supported television camera device controls the operation. In motion picture and television work this forms an important feature.

Referring to Fig. 2, there is shown a perspective view of the pedestal in a bold arrangement and a perspective of the camera which it is adapted to support as a phantom arrangement in order to give a complete view of the entire arrangement.

Referring to Fig. 3 there is shown a view looking toward the pedestal from the back thereof at the foot pedal 25 which is used for actuating the castor member 21. In this arrangement it will be seen that the pedestal frame is notched at the section 28 thereof at a position which is adjacent the slot 25'. The action of this arrangement is as follows. When it is desired to force the castor member 21 downwardly so as to raise the wheel 19 immediately adjacent the castor, the operator may press downwardly on the foot pedal 25 which forces the arm 26 thereof joined to the foot pedal downwardly along the slot 25' and the operator may, by pushing slightly to the right, force the arm below the top of the cutaway section 28 of the pedestal frame with the result that the arm 26 is held in a retentive position, and hence the castor member is held against the floor or other surface for as long a period of time as may be desired. Release may be accomplished by forcing the foot pedal down slightly away from the top of the section 28 of the frame and then applying a slight force directed toward the left, and then releasing the foot pedal where it is forced upwardly in the slot 25'.

What is claimed is:

1. In a mobile supporting pedestal structure for cameras, a pedestal frame, a plurality of wheel holders connected to said pedestal, said wheel holds being rotatably mounted in said pedestal frame, a wheel operatively connected to each of said holders, a sprocket member joined to each of said wheel holders, a sprocket chain operatively associated with all of said wheel holders, a caster member normally retained in unsupported relationship with respect to said pedestal frame, and foot actuated means for bringing the caster into a supporting relationship with respect to said pedestal frame whereby at least one of said wheels is raised into an unsupporting position.

2. In a mobile supporting pedestal structure, a pedestal frame having a slot in the bottom extremity thereof, a plurality of wheels movable around their own axis and turnable about the major axis of the pedestal for normally supporting said pedestal, means for interlocking the movement of said wheels about the major axis of the supporting pedestal, a caster member normally retained in unsupporting relationship with respect to said pedestal frame, a lever arm having a foot pedal mounted at one extremity thereof, and means actuated by said lever arm for bringing said caster into a supporting relationship with respect to said pedestal frame, whereby at least one of said interlocked wheels is raised into an unsupporting position.

3. In a mobile supporting pedestal structure, a pedestal frame member having a slot in the lower extremity thereof, a plurality of interlocked supporting wheels for supporting said frame member, a caster member, a bell-crank lever connected to said caster, spring means for normally retaining said caster in an unsupporting relationship with respect to said pedestal frame, a lever arm passing through the slot in said pedestal frame and protruding outwardly therefrom, a mechanical connection between said lever arm and said bell-crank lever, a foot pedal mounted substantially at the extremity of said lever arm whereby pressure on said foot pedal member brings the caster member into a supporting relationship with respect to the pedestal frame, and means for locking the lever arm into position when the caster member is supporting the pedestal frame.

ALDA V. BEDFORD.
KNUT J. MAGNUSSON.